(12) United States Patent
Newman

(10) Patent No.: US 10,347,887 B2
(45) Date of Patent: Jul. 9, 2019

(54) BATTERY MODULE WITH AUXILIARY COMPONENTS

(71) Applicant: NIO USA, Inc., San Jose, CA (US)

(72) Inventor: Austin Newman, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 82 days.

(21) Appl. No.: 15/366,248

(22) Filed: Dec. 1, 2016

(65) Prior Publication Data
US 2018/0047956 A1 Feb. 15, 2018

Related U.S. Application Data

(60) Provisional application No. 62/372,771, filed on Aug. 9, 2016.

(51) Int. Cl.
| | |
|---|---|
| *H01M 2/10* | (2006.01) |
| *H01M 10/613* | (2014.01) |
| *H01M 10/615* | (2014.01) |
| *H01M 10/625* | (2014.01) |
| *B60L 50/60* | (2019.01) |

(52) U.S. Cl.
CPC ........... *H01M 2/1077* (2013.01); *B60L 50/66* (2019.02); *H01M 10/613* (2015.04); *H01M 10/615* (2015.04); *H01M 10/625* (2015.04); *H01M 2220/20* (2013.01)

(58) Field of Classification Search
CPC ............ H01M 2/1077; H01M 10/613; H01M 10/615; H01M 10/625; H01M 2220/20; B60L 11/1877
See application file for complete search history.

(56) References Cited

U.S. PATENT DOCUMENTS

| | | | |
|---|---|---|---|
| 2007/0175509 A1* | 8/2007 | Yagiura ............... | H01L 31/0352 136/256 |
| 2012/0015223 A1* | 1/2012 | Bhardwaj ........... | H01M 2/1027 429/94 |
| 2016/0049697 A1* | 2/2016 | McGee ............... | H01M 2/1022 340/502 |
| 2016/0093845 A1* | 3/2016 | DeKeuster .......... | H01M 2/1077 429/99 |

* cited by examiner

*Primary Examiner* — Nha T Nguyen
(74) *Attorney, Agent, or Firm* — Sheridan Ross P.C.

(57) ABSTRACT

Described herein is a battery module where the battery module footprint is generally defined by the size and number of battery cells. This is implemented by first optimizing the battery cell structure and stacking orientation for a given battery module footprint. A predetermined number of battery cells are then removed and replaced with components needed to implement a variety of auxiliary functions. For example, the components can be electrical connectors, cooling channels, heating channels and mounting channels for placement of mounting pins. In an implementation, the positions of the removed battery cells can also be mounting points. The predetermined number of battery cells can be a function of the amount of electrical energy needed to be stored by the battery module. The positions of the removed battery cells can be anywhere in the battery module, including the edge or interior positions.

20 Claims, 4 Drawing Sheets

BATTERY MODULE WITH AUXILIARY COMPONENTS

CROSS REFERENCE TO RELATED APPLICATIONS

This application claims the benefit both of U.S. Provisional Patent Application No. 62/372,771, filed Aug. 9, 2016, which is incorporated by reference as if fully set forth.

FIELD OF INVENTION

This application is related to battery modules and in particular, battery module space optimization.

BACKGROUND

Many electric vehicles rely on battery cells bundled into one or more battery modules to power the vehicle. These battery modules require separate connectors and channels to implement a variety of auxiliary functions related to the management and functioning of the battery cells and battery module. This results in the footprint of the battery module being greater than just the size needed to contain the battery cells. That is, the battery module footprint extends beyond the size of the battery cells.

SUMMARY

Described herein is a battery module where the battery module footprint is generally defined by the size and number of battery cells. This is implemented by optimizing the battery cell structure and stacking orientation for a given battery module footprint. A predetermined number of battery cells are then removed for and replaced with a variety of auxiliary functions. In some implementations, the removed battery cells components are replaced with components needed to implement certain auxiliary functions. For example, the components can be electrical connectors, cooling channels, heating channels and mounting channels for placement of mounting pins. The mounting channels can be used to maintain and stabilize the stacking orientation. In an implementation, the positions of the removed battery cells can be mounting points without additional components. The predetermined number of battery cells can be a function of the amount of electrical energy that needs to be stored by the battery module. The positions of the removed battery cells can be anywhere in the battery module, including the edge or interior positions.

BRIEF DESCRIPTION OF THE DRAWING(S)

The foregoing Summary and the following detailed description will be better understood when read in conjunction with the appended drawings, which illustrate a preferred embodiment of the invention. In the drawings.

DETAILED DESCRIPTION

Described herein is a battery module where the battery module footprint is generally defined by the size and number of battery cells. This is implemented by optimizing the battery cell structure and stacking orientation for a given battery module footprint. A predetermined number of battery cells are then removed and replaced with components needed to implement a variety of auxiliary functions. For example, the components can be electrical connectors, cooling channels, heating channels and mounting channels for placement of mounting pins. The mounting channels can be used to maintain and stabilize the stacking orientation. In an implementation, the positions of the removed battery cells can be mounting points without the addition of any components. The predetermined number of battery cells can be a function of the amount of electrical energy that needs to be stored by the battery module. The positions of the removed battery cells can be anywhere in the battery module, including the edge or interior positions.

Figure 1:
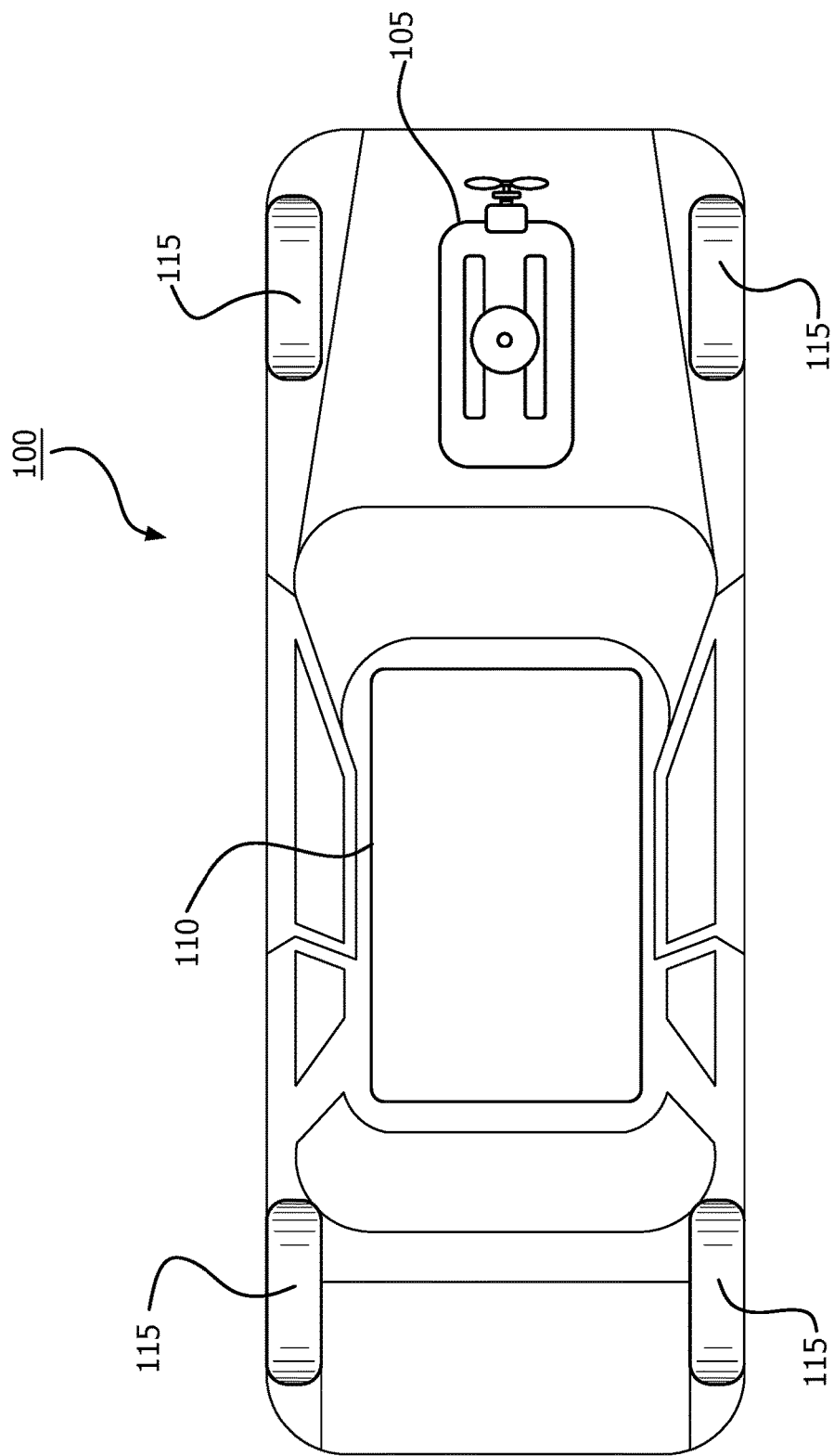
FIG. 1 is a schematic illustration of an electric vehicle including a motor and a battery pack system in accordance with certain implementations.

FIG. 1 is a schematic illustration of an electric vehicle 100. The electric vehicle 100 includes an electric motor 105 and a battery pack system 110. The electric motor 105 is powered by energy stored by the battery pack system 110 to propel the electric vehicle 100 via a plurality of traction devices 115. In an implementation, the battery pack system 110 is an electrical storage system including various components which allow for the storage and delivery of electrical energy to the electric motor 105 and/or receipt of electrical energy from the electric motor 105 or other vehicle system (e.g., through regenerative braking). The battery pack system 110 can include additional components, including busbars, wiring, physical connectors, etc. which allow battery pack system 110 to be operational in conjunction with electric vehicle 100. The electric vehicle 100 also includes other vehicle components not shown, including typical components for electronic vehicles such as steering components, passenger comfort electronics, driver controls, signaling, and the like. While an electric vehicle 100 is shown and described herein, it should be understood that the disclosed implementations are applicable to other systems that use battery pack systems and battery cells.

Figure 2:
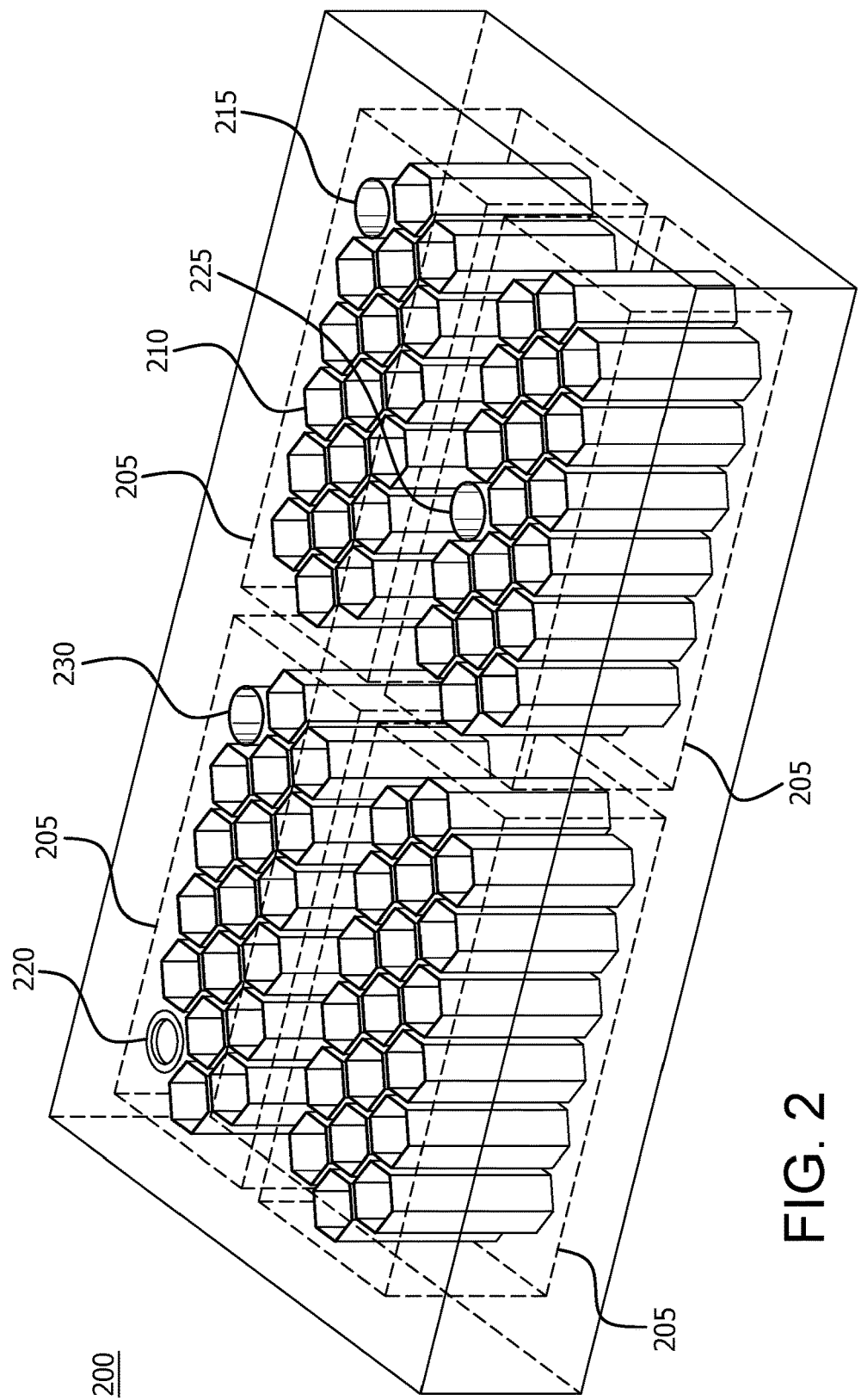
FIG. 2 is a perspective view of an exemplary battery pack system in accordance with certain implementations.

FIG. 2 is a perspective view of a battery pack system 200 in accordance with certain implementations. The battery pack system 200 includes multiple battery modules 205 that are coupled together electrically in order to satisfy particular electrical requirements (e.g., current requirements, voltage requirements, power requirements, or the like) of the electric vehicle 100, for example. Each battery module 205 includes a plurality of battery cells 210 that are electrically connected, (e.g., in parallel and/or in series), into a cohesive unit to satisfy specific electrical requirements of the electric vehicle 100, for example. Each battery cell 210 can be an electrical storage device configured to store electrical energy for use by the electric motor 105. In particular, each battery cell 210 includes energy storage materials that store chemical energy and convert that chemical energy into electrical energy. Each battery cell 210 can be, for example, a replaceable battery, rechargeable battery, or the like. In an implementation, the battery cells 210 are rechargeable lithium-ion batteries, but are not limited thereto.

Each battery module 205 has a footprint within which a predetermined amount of energy is provided and space for implementing a variety of auxiliary functions related to the management and functioning of the battery cells 210 and the battery modules 205. In particular, the battery module footprint is optimized by stacking or packing the battery cells 210 in a manner that promotes efficient use of the space within the battery module footprint. In an implementation, each battery cell 210 provides support to a neighbor battery cell 210 to maintain stack positioning and integrity. In an implementation, support material can be used to provide structural reinforcement. In an implementation, the battery cells are self-aligning. In an implementation, the battery cells 210 are hexagonal and are hexagonally stacked in each battery module 205. The battery cells 210 can be other shapes and use other stacking configurations that promote efficient use of the space within the battery module footprint.

Each battery module 205 is then configured to provide space for implementing the variety of auxiliary functions related to the management and functioning of the battery cells 210 and the battery modules 205. This is implemented by removing or replacing a predetermined number of the battery cells. In an implementation, the predetermined number of the battery cells is dependent upon the amount of energy that a battery module 205 needs to provide. In an implementation, the position of a removed battery cell is a mounting position 220. In an implementation, a removed battery cell is replaced with cooling channels or coolant input or output ports 215. In an implementation, a removed battery cell is replaced with heating channels or heating input or output ports 225. In an implementation, a removed battery cell is replaced with electrical connectors 230 for high or low voltage applications. The functions described herein are illustrative and other auxiliary functions can be implemented, including but not limited to, battery management, and sensor information. By removing or replacing certain battery cells from each battery module 205, the need for having external flanges or similar port structures are eliminated and a battery module footprint is maintained. Consequently, additional battery modules can be added to a battery pack system 200.

Figure 3:
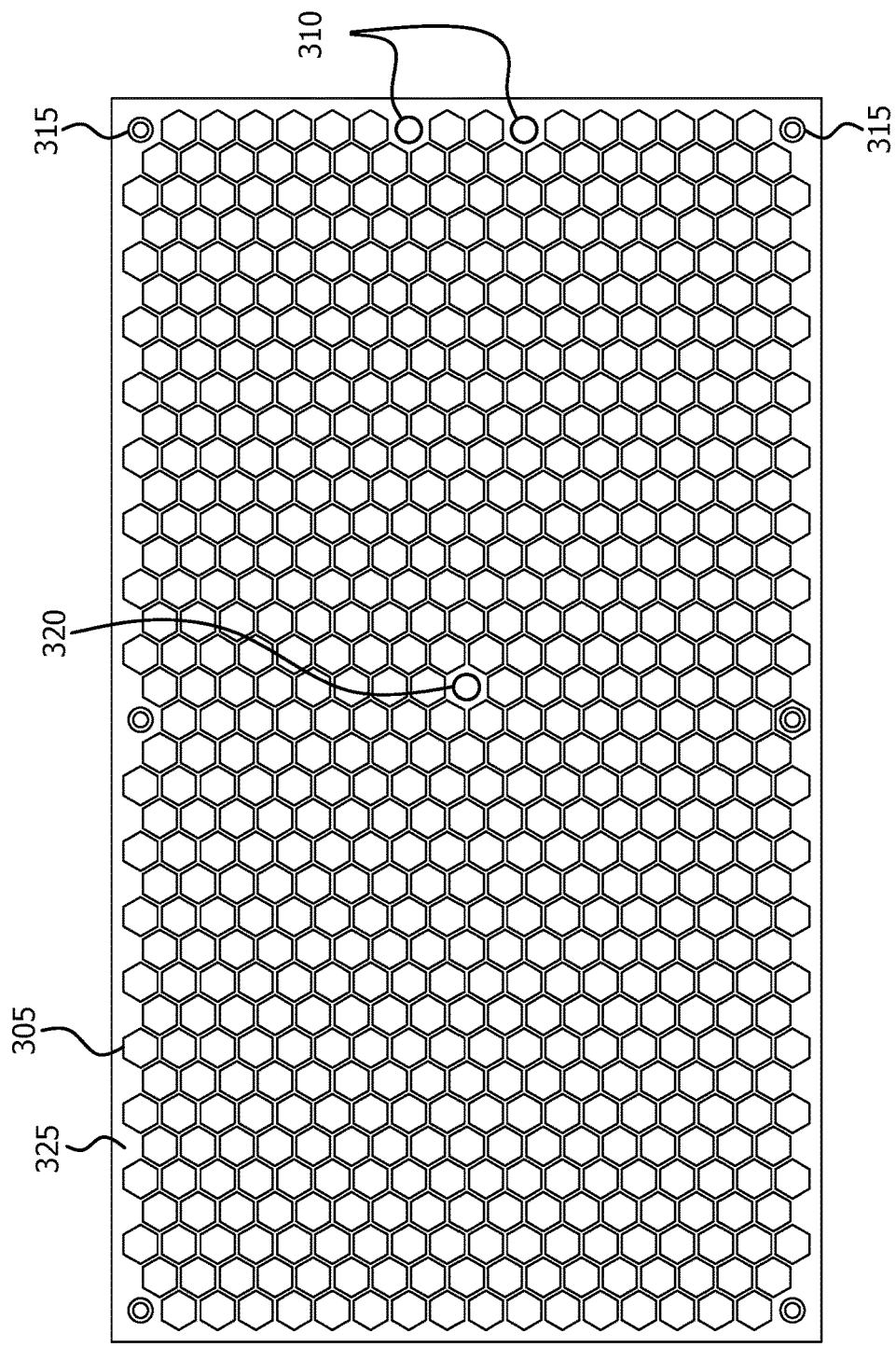
FIG. 3 is a side view of a portion of a battery module of FIG. 2 in accordance with certain implementations.

FIG. 3 is a side view of a portion of a battery module 300 of FIG. 2 in accordance with certain implementations. In an implementation, battery module 300 includes a plurality of battery cells 305. A number of the battery cells 305 have been removed to implement certain auxiliary functions, such as mounting positions 315 and a number of battery cells have been replaced with certain auxiliary functions, such as with coolant structures 310 and heating structures 320. In an implementation, unused battery module spaces 325 can be used to implement auxiliary functions. The auxiliary functions described herein are illustrative and other auxiliary functions can be implemented, including but not limited to, electrical connectors, communication channels, battery management, and sensor information.

Figure 4:
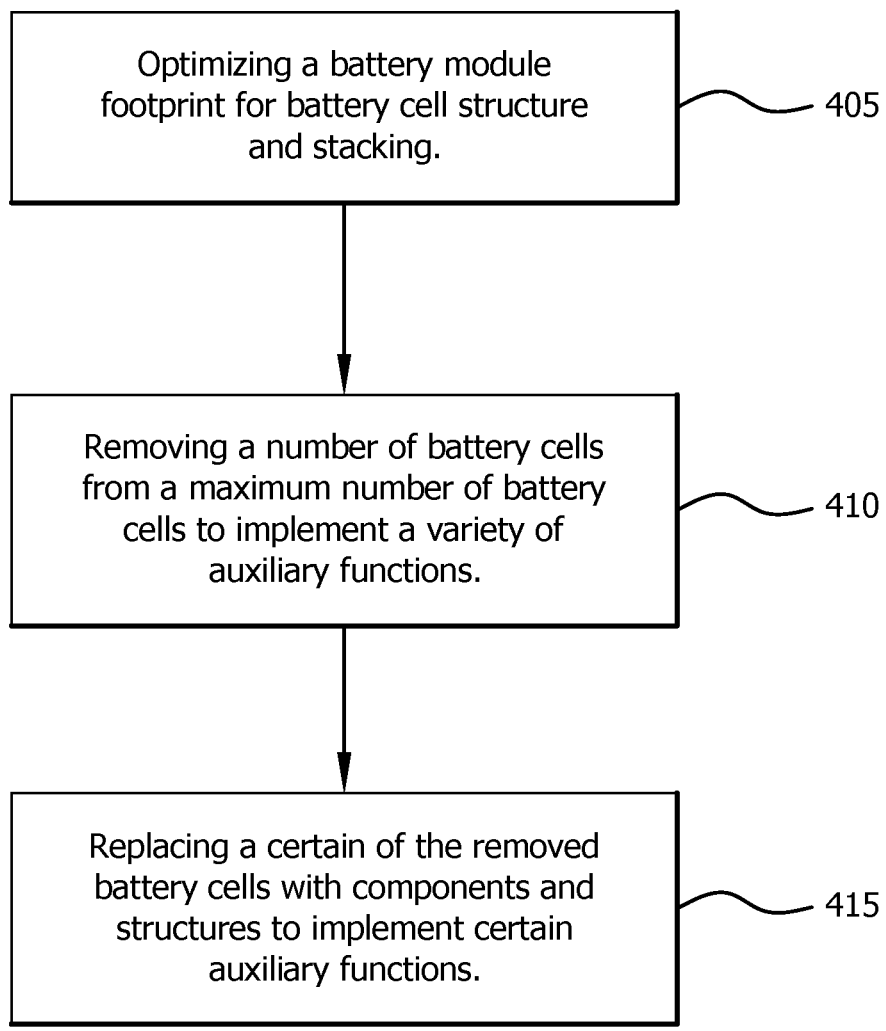
FIG. 4 is an illustrative method for implementing a battery module in accordance with certain implementations.

FIG. 4 is an illustrative method 400 for implementing a battery module in accordance with certain implementations. Initially, a battery module footprint is optimized based on battery cell structure and stacking configuration to determine a maximum number of battery cells (step 405). A number of battery cells from a maximum number of battery cells are removed to implement a variety of auxiliary functions (step 410). Certain of the removed battery cells are replaced with components and structures to implement certain auxiliary functions (step 415).

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

It should be understood that many variations are possible based on the disclosure herein. Although features and elements are described above in particular combinations, each feature or element may be used alone without the other features and elements or in various combinations with or without other features and elements.

What is claimed is:

1. A battery module, comprising:
   a plurality of battery module spaces arranged adjacent to one another inside a footprint of the battery module, wherein each space in the plurality of battery module spaces is sized to receive a battery cell of the battery module;
   a plurality of battery cells disposed in a first set of the plurality of battery module spaces, wherein a number of the plurality of battery cells is less than a total number of the plurality of battery module spaces for the footprint of the battery module; and
   a plurality of auxiliary components disposed in a different second set of the plurality of battery module spaces, wherein a number of battery module spaces in the second set of the plurality of battery module spaces is at most equal to a difference between the total number of the plurality of battery module spaces for the footprint of the battery module and the number of the plurality of battery cells disposed in the first set of the plurality of battery cells.

2. The battery module of claim 1, wherein the number of the plurality of battery cells disposed in the first set and the number of battery module spaces in the second set of the plurality of battery module spaces are equal to the total number of the plurality of battery module spaces for the footprint of the battery module.

3. The battery module of claim 1, wherein the plurality of auxiliary components disposed in the second set of the plurality of battery module spaces includes at least one mounting channel or cooling channel and at least one heating channel or communication channel.

4. The battery module of claim 1, wherein each space in the plurality of battery module spaces is hexagonal, wherein the plurality of battery cells are self-aligning with the first set of the plurality of battery module spaces, and wherein the plurality of battery cells are hexagonal.

5. The battery module of claim 1, wherein the plurality of battery module spaces fill a complete usable space inside the footprint of the battery module.

6. The battery module of claim 5, wherein each battery cell in the plurality of battery cells is identical, and wherein a size of the footprint substantially matches a size of the battery module.

7. A method for optimizing an arrangement and structure of a battery module, the method comprising:
   determining a footprint of the battery module comprising a plurality of battery module spaces arranged adjacent to one another, wherein each space in the plurality of battery module spaces is sized to receive a battery cell of the battery module;
   determining a first set of the plurality of battery module spaces for receiving a number of battery cells, wherein the number of battery cells is less than a total number of the plurality of battery module spaces;

determining a second set of the plurality of battery module spaces for receiving a number of auxiliary components other than battery cells, wherein a number of battery module spaces in the second set of the plurality of battery module spaces is at most equal to a difference between the total number of the plurality of battery module spaces and the number of battery cells in the first set of the plurality of battery cells;

filling each battery module space in the first set of the plurality of battery module spaces with a respective one of the number of battery cells; and filling each battery module space in the second set of the plurality of battery module spaces with an auxiliary component.

8. The method of claim 7, wherein the number of battery cells in the first set and the number of battery module spaces in the second set of the plurality of battery module spaces are equal to the total number of the plurality of battery module spaces for the footprint of the battery module.

9. The method of claim 7, wherein the plurality of auxiliary components in the second set of the plurality of battery module spaces includes at least one mounting channel or cooling channel and at least one heating channel or communication channel.

10. The method of claim 7, wherein each space in the plurality of battery module spaces is hexagonal, wherein the battery cells are self-aligning with the first set of the plurality of battery module spaces, and wherein the plurality of battery cells are hexagonal.

11. The method of claim 7, wherein the plurality of battery module spaces fill a complete usable space inside the footprint of the battery module.

12. The method of claim 11, wherein each battery cell in the battery cells is identical, and wherein a size of the footprint substantially matches a size of the battery module.

13. The method of claim 7, wherein determining the first set of the plurality of the plurality of battery module spaces, further comprises:

comparing an electrical energy capable of being produced by the number of battery cells against a predetermined level of electrical energy to be provided by the battery module.

14. A battery pack for an electric vehicle comprising:
a plurality of battery modules for powering an electric motor of the electric vehicle, each battery module comprising:
a plurality of battery module spaces arranged adjacent to one another inside a footprint of each battery module, wherein each space in the plurality of battery module spaces is sized to receive a battery cell of the plurality of battery modules;
a plurality of battery cells disposed in a first set of the plurality of battery module spaces, wherein a number of the plurality of battery cells is less than a total number of the plurality of battery module spaces for the footprint of each battery module; and
a plurality of auxiliary components disposed in a different second set of the plurality of battery module spaces, wherein a number of battery module spaces in the second set of the plurality of battery module spaces is at most equal to a difference between the total number of the plurality of battery module spaces for the footprint of each battery module and the number of the plurality of battery cells disposed in the first set of the plurality of battery cells.

15. The battery pack of claim 14, wherein the number of the plurality of battery cells disposed in the first set and the number of battery module spaces in the second set of the plurality of battery module spaces for each battery module are equal to the total number of the plurality of battery module spaces for the footprint of the battery module.

16. The battery pack of claim 14, wherein the plurality of auxiliary components disposed in the second set of the plurality of battery module spaces includes at least one mounting channel or cooling channel and at least one heating channel or communication channel.

17. The battery pack of claim 14, wherein each space in the plurality of battery module spaces is hexagonal, and wherein the plurality of battery cells are hexagonal.

18. The battery pack of claim 17, wherein the plurality of battery cells are self-aligning with the first set of the plurality of battery module spaces.

19. The battery pack of claim 14, wherein the plurality of battery module spaces fill a complete usable space inside the footprint of each battery module.

20. The battery pack of claim 19, wherein each battery cell in the plurality of battery cells is identical and wherein a size and shape of the footprint for each battery module substantially matches a size and shape of each battery module.

\* \* \* \* \*